United States Patent [19]

Vegh et al.

[11] 4,281,636
[45] Aug. 4, 1981

[54] STEAM PROCESSOR

[76] Inventors: Elmer S. Vegh, 5290 Graham Dr., Lyndhurst, Ohio 44124; Donald F. Klier, 6511 Forest Ave., Parma, Ohio 44129; Davis S. Schwerzler, 8750 N. Spring Valley, Chagrin Falls, Ohio 44022; William F. Castle, 1330 W. 67th St., Cleveland, Ohio 44102

[21] Appl. No.: 46,459

[22] Filed: Jun. 7, 1979

[51] Int. Cl.³ .......................... F24D 1/00; A21B 1/08; F24H 1/10; A01J 11/04
[52] U.S. Cl. .................................. 126/369; 126/348; 126/20; 126/34; 219/307; 99/467
[58] Field of Search ...................... 126/5, 20, 34, 344, 126/369, 377, 20.1, 20.2; 219/307, 401; 122/379; 99/467, 468, 470

[56] References Cited

U.S. PATENT DOCUMENTS

| | | | |
|---|---|---|---|
| 1,621,736 | 3/1927 | Middleton | 126/5 |
| 1,976,423 | 10/1934 | Wallace | 126/5 |
| 3,291,030 | 12/1966 | Arnold | 219/401 |
| 3,327,690 | 6/1967 | Higgins | 122/379 |
| 3,604,895 | 9/1971 | MacKay | 219/401 |
| 3,680,531 | 4/1972 | Holdt | 122/379 |
| 3,823,661 | 7/1974 | Kells | 99/468 |
| 3,872,920 | 3/1975 | Homma et al. | 122/379 |
| 4,011,805 | 3/1977 | Vegh et al. | 99/467 |
| 4,187,325 | 2/1980 | Tyree, Jr. | 99/470 |

Primary Examiner—Samuel Scott
Assistant Examiner—Wesley S. Ratliff, Jr.
Attorney, Agent, or Firm—Watts, Hoffmann, Fisher & Heinke Co.

[57] ABSTRACT

A steam processor for preparing or warming food items. The processor includes a cooking chamber having a steam inlet and outlet, and an adjacent steam generator for supplying steam to the chamber. The steam generator includes a water level control system for maintaining a water level within the generator within predetermined limits and an immersion heater for vaporizing the water. A steam control is provided that regulates the heater to control the rate at which steam is produced and flows into the cooking chamber. The processor includes an automatic drain feature which discharges any water within the steam generator whenever power to the processor is terminated. A steam condenser that condenses steam exhausted by the chamber is disposed near the outlet of the cooking chamber. The condenser precipitates a sub-atmospheric pressure at the outlet which serves to purge air from the chamber and enhance the flow of steam into the chamber. The water supply for the steam generator flows through a preconditioner which pretreats the water to minimize the formation of deposits in the steam generator and associated plumbing.

8 Claims, 12 Drawing Figures

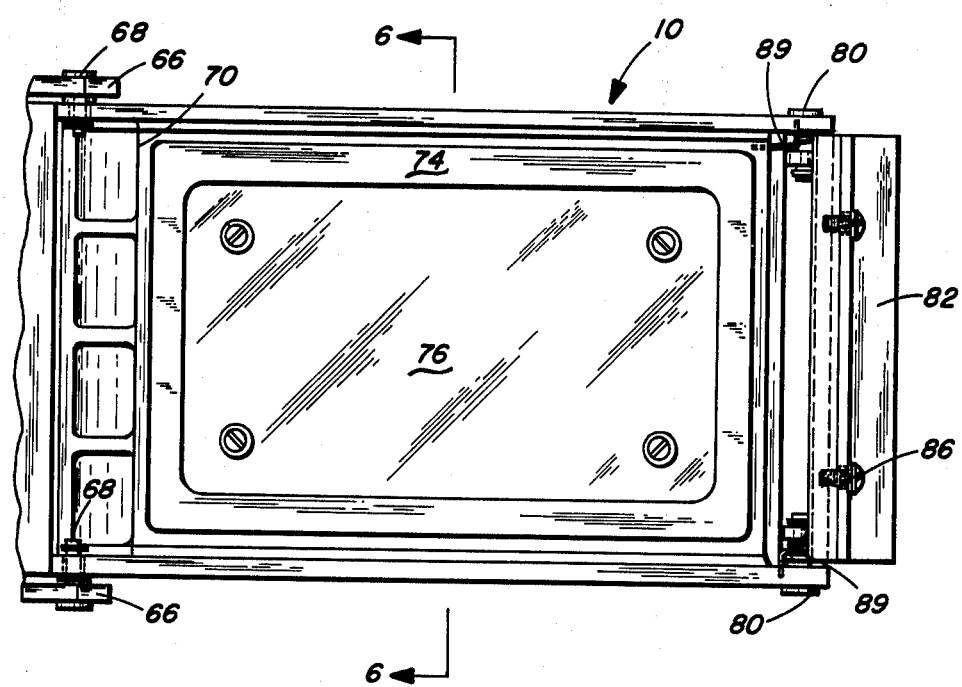
FIG. 5
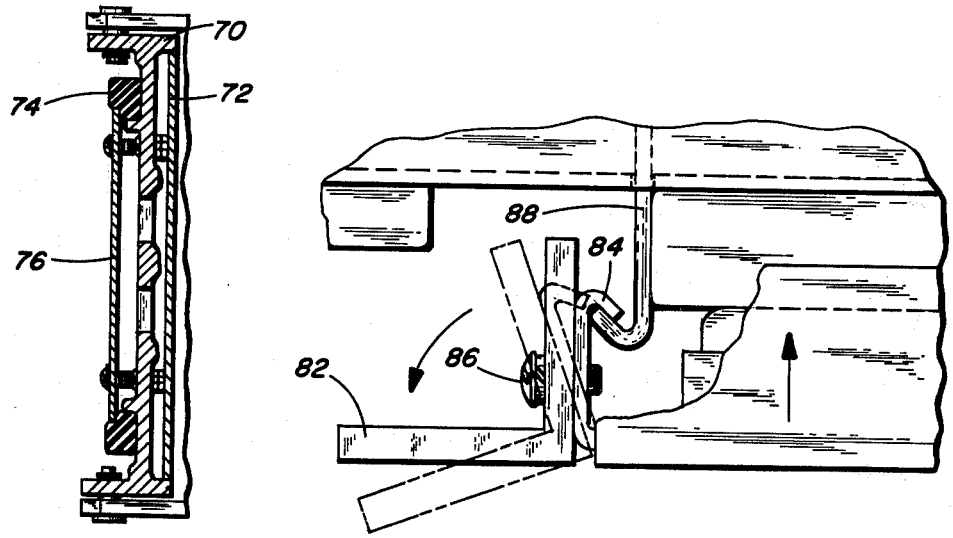
FIG. 6
FIG. 7

STEAM PROCESSOR

BACKGROUND OF THE INVENTION

The present invention relates generally to cooking apparatus and in particular to a steam cooker for processing and reconstituting food items.

A steam cooker generally consists of a cooking chamber and a source of steam. Heat from the steam is transferred directly to food items placed in the cooking chamber. As heat is transferred to the food items, the steam condenses and the resulting condensate may or may not be drained from the chamber during the cooking cycle.

Cooking food in the presence of steam has been found to be very efficient and to have a minimal affect on taste, texture, color and other characteristics of the food. The moist cooking environment provided by the steam, prevents food from dehydrating as it often does in radiant heat or convection air type ovens.

Because the steam, which completely surrounds the food contains an enormous amount of heat, this type of oven will cook food very fast and is especially useful for thawing frozen foods. Generally, the steam for cooking will be in the vicinity of 212°-248° F. This relatively moderate temperature coupled with the heat exchange efficiency between the steam and the food allows food items to be thawed very quickly within the oven without adversely affecting food quality. Because of this operational flexibility and the ability to process large amounts of food in relatively short spans of time, steam cookers are very popular in commercial food establishments.

Early steam cookers were usually rather large devices having multiple cooking compartments which were supplied with steam sources separate from the steam cooker unit. A need for a compact, counter top steam cooker for small commercial establishments was recognized and various constructions to fill this need have been proposed.

One such unit includes a steam generating means as part of the cooking compartment. It includes a reservoir of water below the cooking chamber which is boiled to produce steam for cooking. As the water boils, the steam rises and flows into the cooking compartment to heat food placed therein. As the steam cools, the condensate returns to the reservoir.

In another proposed unit, a separate steam generator produces the necessary cooking steam. The steam generator is of the electrode type and the steam produced is generally admitted to the cooking chamber through a valve controlled conduit. In this steam cooker, the operator must select an interval of time over which steam is produced and allowed to enter the cooking chamber. Because the steam is produced at a relatively constant rate, the operator must carefully select the cooking time to avoid overcooking the food.

Some of these prior steam cookers utilize an electrode-type heater for producing steam in the steam generator. This type of heater usually consists of a pair of spaced electrodes suspended in a reservoir of water. When voltage is applied, water in the current path between the electrodes is heated. The amount of heat generated is, in part, dependent on the depth to which the electrodes are immersed in the reservoir and the conductivity of the water. For this reason, it is imperative that steam generators of this type have precise water level control and water conductivity compensation to insure a uniform rate of heating.

The production of steam in the prior steam cookers, in general, cannot be varied. Steam is produced and conveyed to the cooking chamber throughout the cooking cycle at a rate limited only by the capacity of the steam generator or the steam conduits. Many foods, especially frozen varieties, can only accept heat from the steam at a specific rate. Heat that cannot be absorbed by the food is usually exhausted as excess steam without making a contribution to the heating process. The production of steam in excess of that required is both energy and water wasteful.

One prior art unit attempted to overcome this problem, at least partially, by operating the steam cooker at approximately 12 psi above atmospheric pressure. In the past, it has been found that the use of pressurized steam increases the heat exchange rate between the steam and the food being processed. The use of pressurized steam, however, adds to the complexity of the steam cooker and only partially solves the shortcomings of the prior units. Certain safety features must be incorporated on these types of steam cookers to guard against the opening of the cooking chamber door when under pressure and, therefore, precludes, a user from observing the cooking progress of the food. The operator must wait for the cooking cycle to terminate and for the pressure to be released before the door can be safely opened. Additionally, a multitude of safety features is normally required to prevent excessive pressure build-up in the generator and in the cooking chamber.

The prior steam cookers suffer from a second shortcoming, also related to the inability to control the steam production rate on these cookers. It is often desirable to keep food warm until it can be served, which in some cases may be as long as thirty minutes. The prior steam cookers are unable to provide this function. At the conclusion of a cooking cycle in these prior units, the production of steam terminates and if the food is left in the cooking chamber it will begin to cool. If, however, the cooking cycle is extended in an attempt to keep the processed food warm, the food will be overcooked by the excessive amount of steam entering the cooking chamber.

Another problem associated with prior steam cookers is a gradual build-up of scale and corrosion in the steam generator. Many of the prior units do not address this problem at all and therefore the steam generators in these units require periodic service to remove the deposits. Some units provide an automatic or manual boiler blowdown feature in an attempt to minimize the formation of scale. If the scale is allowed to accumulate, the heating efficiency of the boiler heater will be impaired, and more importantly, the deposits may eventually block or excessively restrict conduits and valving communicating with the generator. Draining or "blowing down" the steam generator after each use will only retard the accumulation of scale but will not totally elminate the problem.

SUMMARY OF INVENTION

The present invention provides a new and improved steam processor for preparing and warming food items. The processor includes a cooking chamber having a steam inlet and an outlet for discharging excess steam and condensate, and a cooking chamber door providing access to the interior of the chamber. The heat for cooking and warming the food is provided by a source of steam which, in the preferred embodiment, includes a steam generating vessel communicating with the steam inlet through a steam supply conduit. Water is supplied to the vessel and converted to steam by a heater located within the steam generator. According to an important feature of the invention, an operator-adjustable steam control is provided so that an operator can select the rate at which steam flows into the cooking chamber.

The present invention presents significant operational advantages over prior art steam cookers. The incorporation of a variable steam control allows a cooking cycle to be tailored to the type of food being processed. Prior art cookers, which operated at fixed steam flow rates, became energy wasteful if the food items could not absorb heat as quickly as it was made available. In the present invention, the operator can select the rate at which heat is supplied, in the form of steam, to the cooking chamber, thereby minimizing steam waste. Moreover, the steam control can be adjusted to provide a reduced flow of steam, which keeps food warm once it has been cooked.

In a preferred embodiment, the heater for the steam generator is an electrically powered immersion heater disposed in the steam generating vessel. The operator adjustable steam control regulates the electrical power applied to the heater to control the production of steam in the steam generating vessel. The steam control preferably cycles the heater on and off and, more specifically, controls the duration and frequency at which the heater is energized.

This type of heater and associated steam control provides an efficient and reliable method for producing and regulating steam for the cooking chamber. The use of an immersion type heater obviates the need for water conductivity compensation as is often required in electrode-type steam generators. Adjustments to the steam production rate are easily made by the operator and the control itself is of a simple construction and does not require complex circuitry or an excessive number of control components.

One feature of the invention is a combination water inlet and drain conduit through which water is supplied to the steam generating vessel. A T connection communicates the combination conduit with individual water supply and drain conduits. The flow of water through the drain conduit from the vessel is controlled by a normally-open solenoid actuated valve. This valve configuration provides automatic steam generator "blowdown" or draining when the steam cooker is turned off or power to the unit is interrupted.

According to the invention, a water level sensing probe is included as part of the steam generator. The probe, working in conjunction with associated circuitry, operates a water supply control valve that controls the flow of water into the generator through the water supply conduit. In accordance with this feature, a baffle-like plate is mounted inside the steam generating vessel intermediate the water level sensing probe and the heater. This baffle plate establishes a "quiet zone" for the sensing probe so that the turbulence and froth precipitated by the boiling water will have a minimal effect on the accuracy of the water level measurement.

Another feature of the invention is an adjacent mounting of the steam generating vessel to the cooking chamber and the enclosure of both in a common sheet metal cabinet. This arrangement provides a compact, counter top steam cooker requiring only water supply and electrical connections and further provides a large cooking capacity in a small space.

In the preferred embodiment, the steam processor includes a steam condensor for producing a sub-atmospheric pressure at the cooking chamber outlet. Maintaining a low pressure at the outlet serves to purge the cooking chamber of air and thereby enhances the heat exchange rate between the steam and the food being processed. This partial vacuum further encourages the flow of steam from the steam generator into the cooking chamber. In a preferred form, the steam condenser includes a spray nozzle communicating with the interior of a drain manifold attached to the cooking chamber outlet. The nozzle is oriented within the drain manifold to produce a fan-shaped water spray, which is directed downstream with respect to the chamber outlet. The nozzle injects water into the manifold to cool and condense any steam discharged through the outlet, causing an attendant decrease in pressure in this area. Water is supplied to the nozzle only when the steam generator heater is energized, to minimize water usage.

To minimize the formation and accumulation of scale within the steam generating vessel, the steam processor preferably includes a water pre-conditioner disposed in the water supply conduit. The pre-conditioner acts upon the chemical components carried in the water that are responsible for the scale formation, and causes these components to take on the composition of an amorphous powder that leaves the steam generating vessel whenever it is drained. While in an amorphous powder state, the deposits cannot adhere to the vessel walls nor accumulate during the life of the processor. Moreover, the minute particle size will not gradually block the drain conduits or control valving.

Further features and advantages of the invention will become apparent in reading the detailed description made with reference to the accompanying drawings.

BRIEF DESCRIPTION OF THE DRAWINGS

FIG. 5 is an elevational view of the cooking chamber door.

FIG. 6 is a cross-sectional view of the cooking chamber door along line 6—6 of FIG. 5. FIG. 7 is a top fragmentary view of the door latch mechanism attached to the cooking chamber door, with portions of the door broken away to show added detail.

DESCRIPTION OF THE PREFERRED EMBODIMENT

Figure 1:
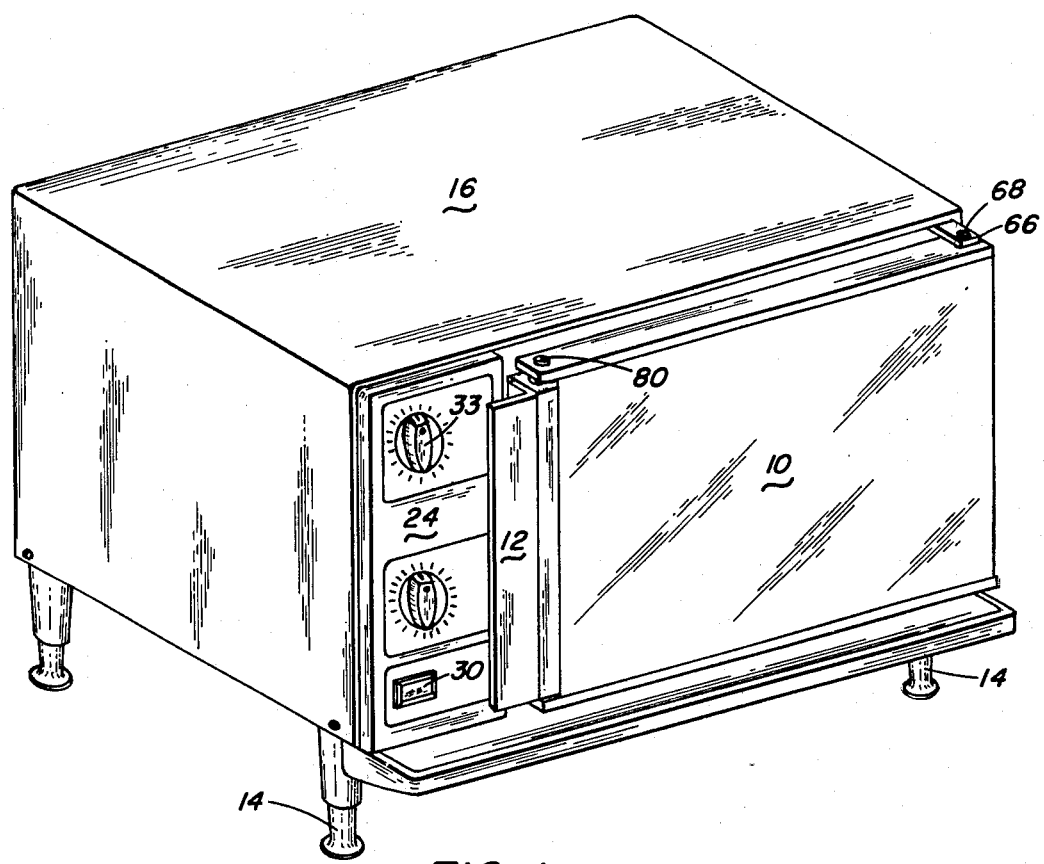
FIG. 1 is a perspective view of the overall steam processor of the present invention.
Figure 2:
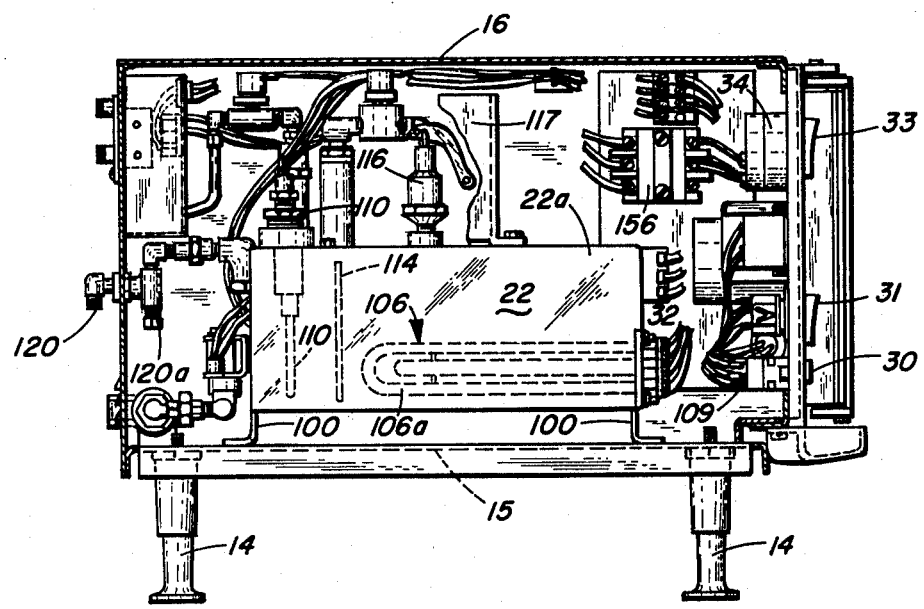
FIG. 2 is an interior view of the steam processor showing the steam generator means and the associated hardware and plumbing.
Figure 3:
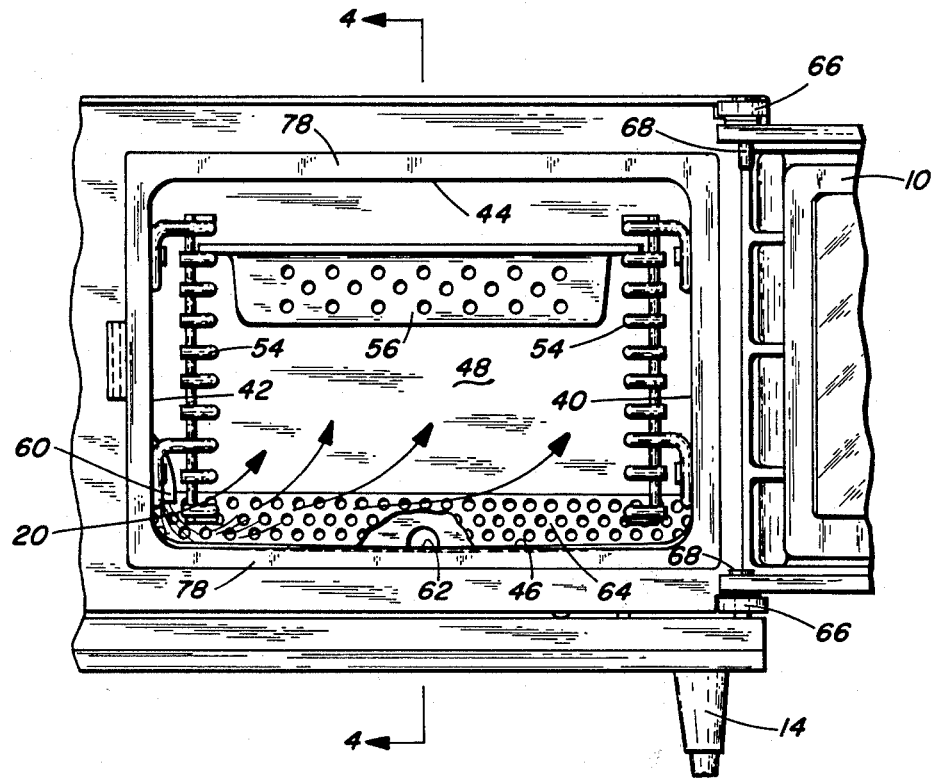
FIG. 3 is a front fragmentary view of the processor with the front door opened, showing the interior of the cooking chamber.

FIG. 1 illustrates the overall steam processor of the present invention. Referring also to FIGS. 2 and 3, the processor is generally rectangular in shape and includes a cooking chamber 20 (shown in FIG. 3) and a steam generating apparatus 22 (shown in FIG. 2), both enclosed by common sheet metal cabinet 16. A cooking chamber door 10 having a door latch 12, is hinged to the front of the processor and provides access to the interior of the cooking chamber 20. A front panel 24 supports a plurality of operator controls which include a "water on" power switch 30, a steam control knob 31 operatively attached to a steam control 32 and a timer control knob 33 operatively attached to a timer 34. A plurality of support legs 14 are threadedly engaged by a base plate 15 (shown in FIG. 2).

Figure 4:
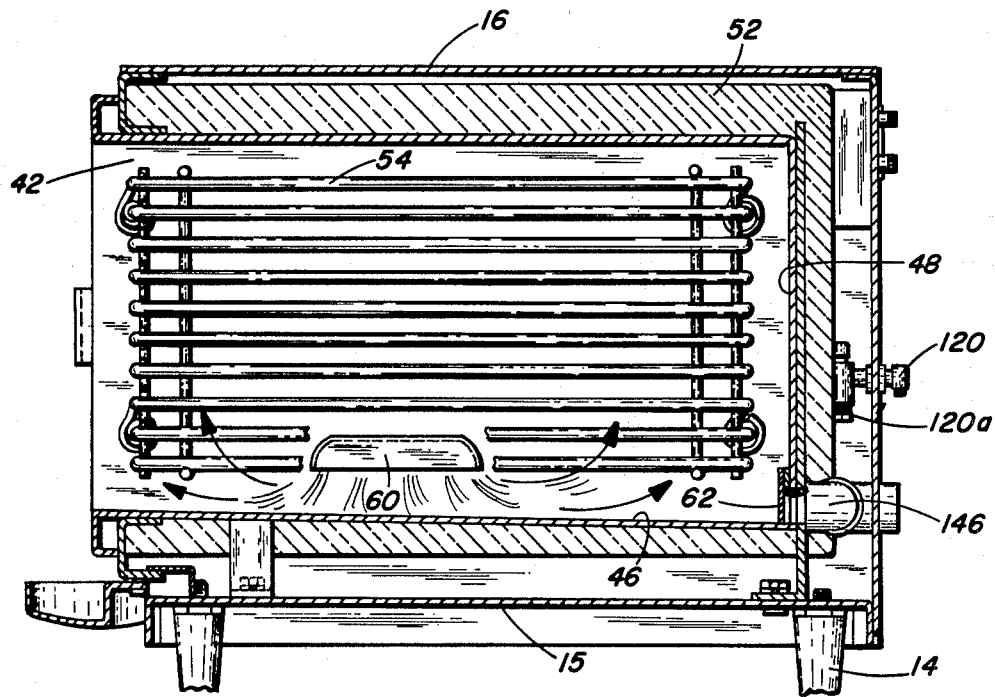
FIG. 4 is a view, partly in cross-section and partly in elevation of the interior of the cooking chamber along line 4—4 of FIG. 3.

Referring to FIGS. 3 and 4, the cooking chamber 20 is defined by a pair of oppositely disposed sidewalls 40, 42, top and bottom walls 44, 46, a back wall 48 and the door 10. The entire chamber 20 is surrounded by suitable insulation material 52. A pair of racks 54 are suitably attached to the sidewalls 40, 42 and are adapted to support a plurality of trays, one of which is shown as 56. The sidewall 42 includes a baffle-like steam inlet 60 through which steam enters the chamber during a cooking cycle. As shown in FIG. 3, the baffle 60 directs the steam downwardly towards the bottom wall 46. The steam is dispersed throughout the chamber, in a generally circular pattern, this orbit-like flow being induced partially by the curvilinear juncture of the bottom sidewalls 42, 46 and partially by the tendency for the heated steam to rise in the chamber.

An outlet 62 disposed in the chamber rear wall 48 allows condensate and excess steam to drain and exit the chamber. A perforate plate 64 prevents food particles, which may drop from the trays 56, from entering the outlet and causing drain blockage.

The cooking chamber access door 10 is pivotally mounted to a pair of lugs 66 by a pair of pivot pins 68, see FIG. 5. Referring also to FIG. 6, the door 10 is of a composite construction including an aluminum support casting 70, a front sheet metal panel 72 suitably fastened to the casting 70, an elastomeric door gasket 74 and an inner sheet metal cover 76 also fastened to the casting 70. The gasket 74 is generally rectangular in shape, and is compressively captured between the inner door plate 76 and the support casting 70. When the door is closed, the door gasket 74 sealably engages a front surface 78 about the opening to the cooking chamber 20 to prevent steam leakage between the door 10 and the chamber 20 (shown in FIG. 3).

The latch 12 is hingedly attached to the door 10 by pivot pins 80 (shown in FIGS. 1 and 5) and includes an L-shaped bracket 82 attached to a locking member 84 by suitable fasteners 86, see FIG. 7. When the door is closed, the locking member 84 engages a stationary latch member 88 to maintain door closure. The latch 12 is biased towards the locking position by a pair of springs 89 disposed around each pivot pin 80 (shown in FIG. 5).

Figure 8:
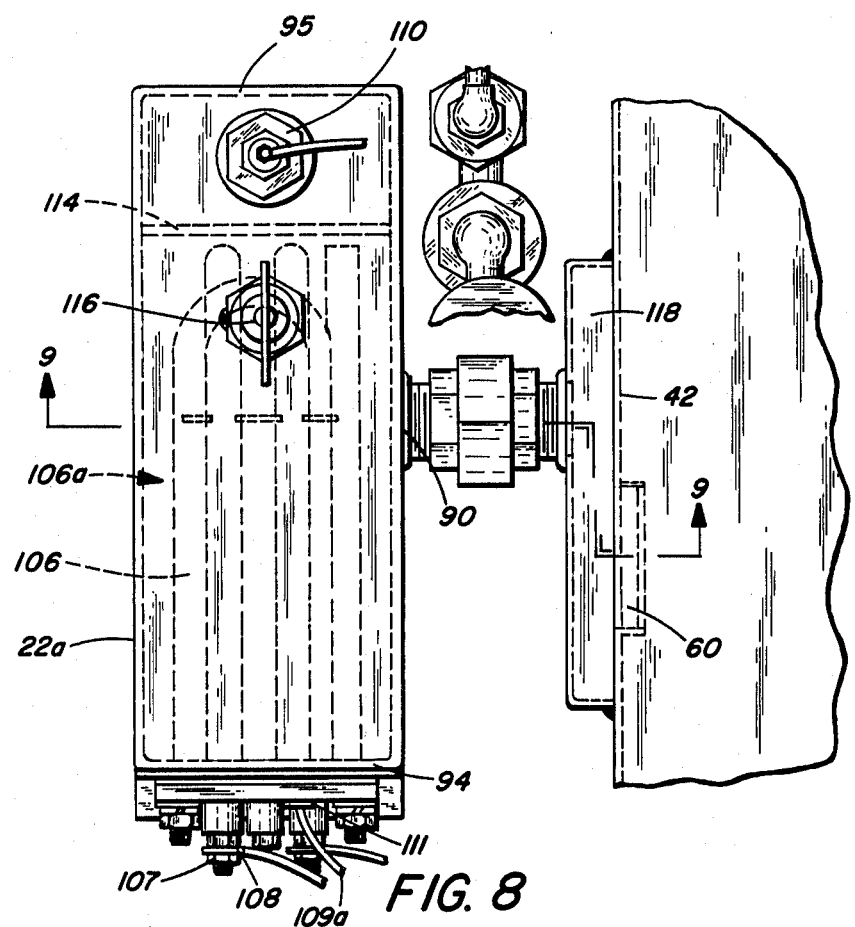
FIG. 8 is a top fragmentary view, in elevation, of the steam generator and a portion of the cooking chamber.
Figure 9:
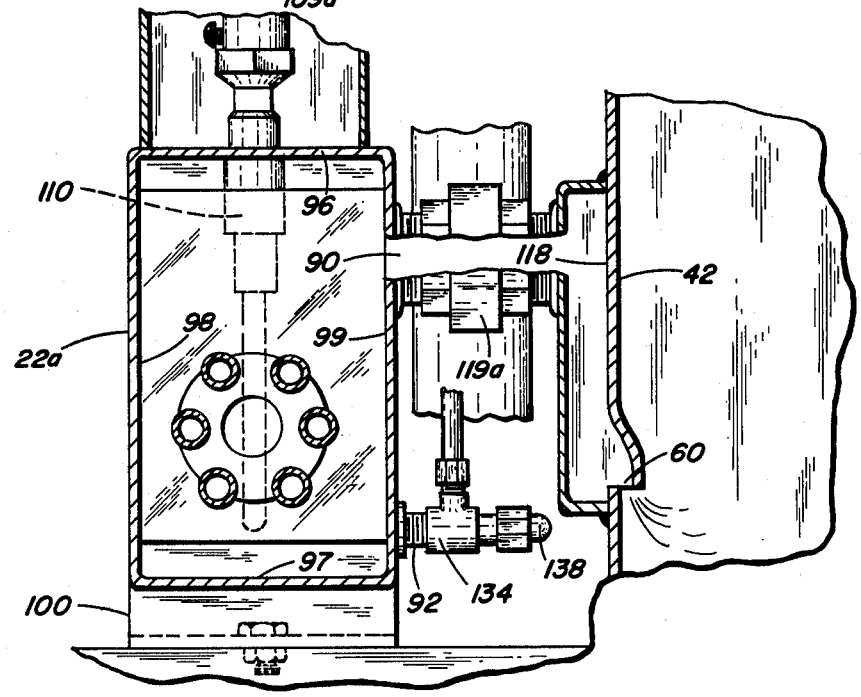
FIG. 9 is a view along line 9—9 of FIG. 8, partly in cross-section and partly in elevation.
Figure 11:
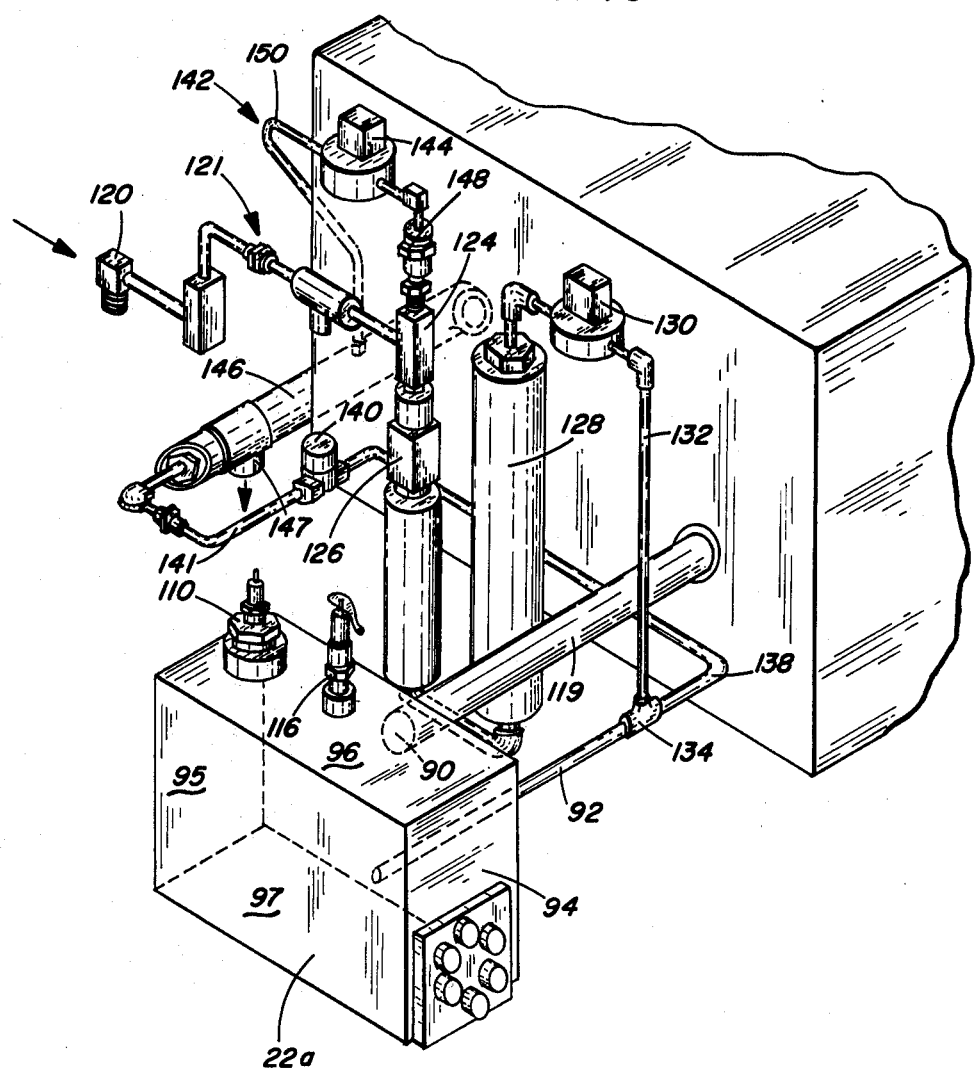
FIG. 11 is a pictorial view of the plumbing and valving associated with the steam generator and cooking chamber of the present invention.

Steam for the cooking chamber 20 is provided by a steam generating apparatus housed in close proximity to the cooking chamber 20. This configuration provides a free-standing compact cooking system. In this embodiment, the steam generator 22 is adjacent one side of the cooking chamber 20 and, as shown in FIGS. 8, 9 and 11 includes a rectangularly-shaped boiler compartment or vessel 22a having a steam outlet 90 and a combination water inlet and drain conduit 92 disposed near the bottom of the compartment.

The steam generating vessel 22a is preferably constructed of stainless steel and surrounded by fiberglass insulation. The vessel 22a is defined by front and back walls 94, 95, top and bottom panels 96, 97 and oppositely disposed sidewalls 98, 99. It is supported on a pair of L-shaped brackets 100 which are suitably fastened to the processor base plate 15.

A lower portion of the vessel 22a forms a reservoir that is filled with water when the processor is being used. The water is boiled and converted to steam by a heating unit disposed within the reservoir. The heat needed for converting water to steam is provided by an electric immersion heater 106 (shown best in FIG. 2) which is attached to the front boiler wall 94 and extends into the reservoir portion of the boiler chamber 22a. In the preferred form, the heater 106 includes a plurality of tubular resistance elements 106a which have a total power capacity of 5 kilowatts. The electrical connections for the elements 106a terminate outside the chamber at terminals 107 having threaded fasteners for connection to suitable wire terminals 108.

A thermostat 109 (shown in FIG. 2) deactivates the heater if it exceeds a predetermined temperature. Excessive heater temperature will usually occur if an inadequate amount of water is present in the boiler. The thermostat 109 includes a sensing tube 109a (shown in FIG. 8), disposed in a thermowell 111 which is brazed to the top heater element 106a. In the preferred embodiment, the thermostat 109 will open at a sensed temperature of 235° F. and will close at a sensed temperature of 208° F.

A water level sensing probe 110 is mounted to the top panel 96 and extends downwardly into the chamber. The sensing probe 110 operates in conjunction with a solid state control module 112 (shown in FIG. 12), to maintain the fluid level in the steam generator at a predetermined level.

Whenever the water is below the predetermined level, the probe 110 signals the module 112, which in turn operates valving to allow water to flow into the vessel 22a until the appropriate water level is reached. Because the boiling water will cause fluctuations in the water level at the probe, the module 112 will operate to add water only after the probe 110 has sensed a low water level continuously for an interval of time, preferably at least six seconds.

According to another feature of the invention, a baffle plate 114 is interiorally mounted within the boiler, intermediate the probe 110 and the heater 106. The baffle 114 establishes "a quiet zone" for the sense probe 110, so that the froth and turbulence of the boiling water, will have a minimal effect on the accuracy of the water level measurement.

A relief valve 116 is mounted to the top panel 96 and communicates with the interior of the boiler. The valve 116 is operative to exhaust steam from the boiler if the pressure exceeds a predetermined level. In the preferred embodiment, a low virtually atmospheric, pressure is desired and therefore the relief valve 116 is designed to exhaust steam if the pressure exceeds one psi above atmospheric. A shield 117 (shown in FIG. 2) partially surrounds the relief valve 116 to direct any exhausted steam away from the electrical hardware situated nearby and out louvers (not shown) disposed in the sheet metal cabinet 16.

The steam produced by the steam generator is conveyed from the outlet 90 to a diffusion chamber 118 by a steam supply conduit 119 shown in FIG. 11, preferably in the form of a union 119a shown in FIG. 9. The diffusion chamber 118 is generally rectangular in shape and communicates with the cooking chamber 20 through the steam inlet 60. The diffusion chamber 118 disperses the steam and insures that the flow of steam out of the inlet 60 is uniform.

An important feature of this invention resides in the provision for regulating the rate at which steam enters the cooking chamber 20. In the preferred embodiment, this is accomplished by controlling the rate at which steam is produced by the steam generator 22. The steam control 32 (adjustable by an operator through knob 31), regulates the "on time" of the heater 106. When the control is moved to a maximum setting, the heater 106 is energized continuously and the steam generator 22 produces a maximum flow rate of steam. As the control 32 is moved away from the maximum setting towards its minimum position, the heater 106 is energized intermittently or in other words cycled on and off, to produce a lower average flow rate of steam proportional to the actual amount of heater "on time" in relation to the "off time." At the minimum setting, the steam control 32 produces a flow rate of steam equal to 7.5 percent of the maximum flow rate of steam that is produced at the maximum setting. A 7.5 percent flow rate has been found to be beneficial in that it allows the steam cooker to be used in a warming mode to keep prepared food warm until it can be served.

The plumbing and associated valving for the steam processor is shown in FIG. 11. The unit requires an external water supply which is connected to inlet nipple 120 that is accessible at the rear of the unit (shown better in FIG. 2). An alternate connection 120a is also provided. The water supply is communicated through conduits and couplings, shown generally as 121, to a T connector 124 from where it branches into separate water supply circuits for the steam generator 22 and a steam condenser which will be described below.

The water supply for the steam generator travels downwardly from the T 124 and through a flow regulator 126. The flow regulator 126, which is commercially available, utilizes a deformable elastomeric flow element that changes the flow restriction through the regulator in response to changes in water supply pressure. The regulator is preferably operative to maintain a constant ⅛ gallon per minute flow regulation for a water supply pressure range of 20 to 80 psi.

The water for the generator flows from the regulator 126 into a water conditioning device 128 that pretreats the water prior to entry into the steam generator, to minimize the formation of scale deposits in the boiler. The conditioning device 128 is commercially available from Superior Water Conditioners, a division of Superior M-Tow, Inc. The conditioning device 128 acts upon those constituents in the water which are responsible for scale production and converts them to an amorphous powder which is easily drained along with the fluid contents of the steam generator 22. By insuring that the scale producing chemical agents remain in this amorphous powder state, the formation of scale and deposits within the steam generator 22 are inhibited and the life of the unit is substantially increased.

The flow of water out of the conditioning device 128 and into the steam generator 22 is controlled through a normally closed solenoid operated valve 130. When valve 130 is opened, water flows downwardly through a conduit 132 which terminates in a T connection 134, from where the water then enters the steam generator 22 through the conduit 92.

The T connection 134 communicates the water supply conduit 132 with the combination water inlet and steam generator drain conduit 92 and also communicates a drain conduit 138 with the combination conduit 92. The water flow through the drain conduit 138 is controlled by a normally opened solenoid actuated valve 140 which, when energized, allows the vessel 22a to fill with water flowing from the supply conduit 132. When the steam processor is turned off, the solenoid valve 140 is de-energized and the contents of the vessel 22a is discharged into a drain manifold 146, through the conduit 138, the valve 140 and a drain conduit 141.

In a preferred embodiment, the steam processor includes a steam condensing system communicating with the cooking chamber outlet 62. The condensing system is somewhat similar to that disclosed in U.S. Pat. No. 4,011,805 which is also owned by the present assignee. The steam condensing system is operative to create a sub-atmospheric pressure at the cooking chamber outlet 62 which serves to increase the amount and rate at which air is purged from the chamber and results in increased heat transfer between the steam and the food being processed.

Figure 10:
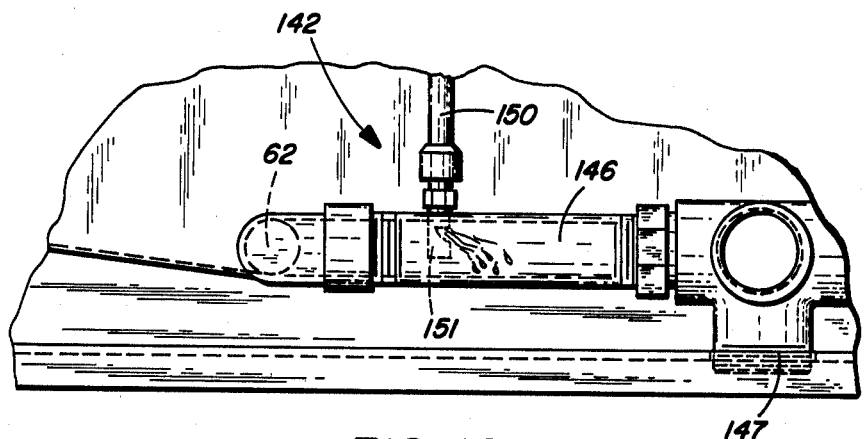
FIG. 10 is a fragmentary view of a steam condenser employed in the present invention.

As shown in FIGS. 10 and 11, the condensing system includes a water supply, designated generally by reference numeral 142. A normally closed solenoid operated valve 144 controls the flow of water from the T 124 to the drain manifold 146. The rate of water flow through the condensing system 142 is regulated by a flow regulator 148 similar to the flow regulator 126 and is also commercially available. When the valve 144 is open, water flows at a rate, determined by the regulator 148, through a supply conduit 150 and is discharged into the drain manifold 146 through a spray orifice 151. As shown in FIG. 10, the orifice 151 is oriented so that the discharged water is directed downstream. The nozzle produces a pattern of finely divided water droplets which abruptly cool and condense any steam exhausted through the chamber outlet 62 to precipitate a sub-atmospheric pressure in the drain manifold 146. The condensate and cooling water then flows out of the manifold 146 into a drain 147.

Figure 12:
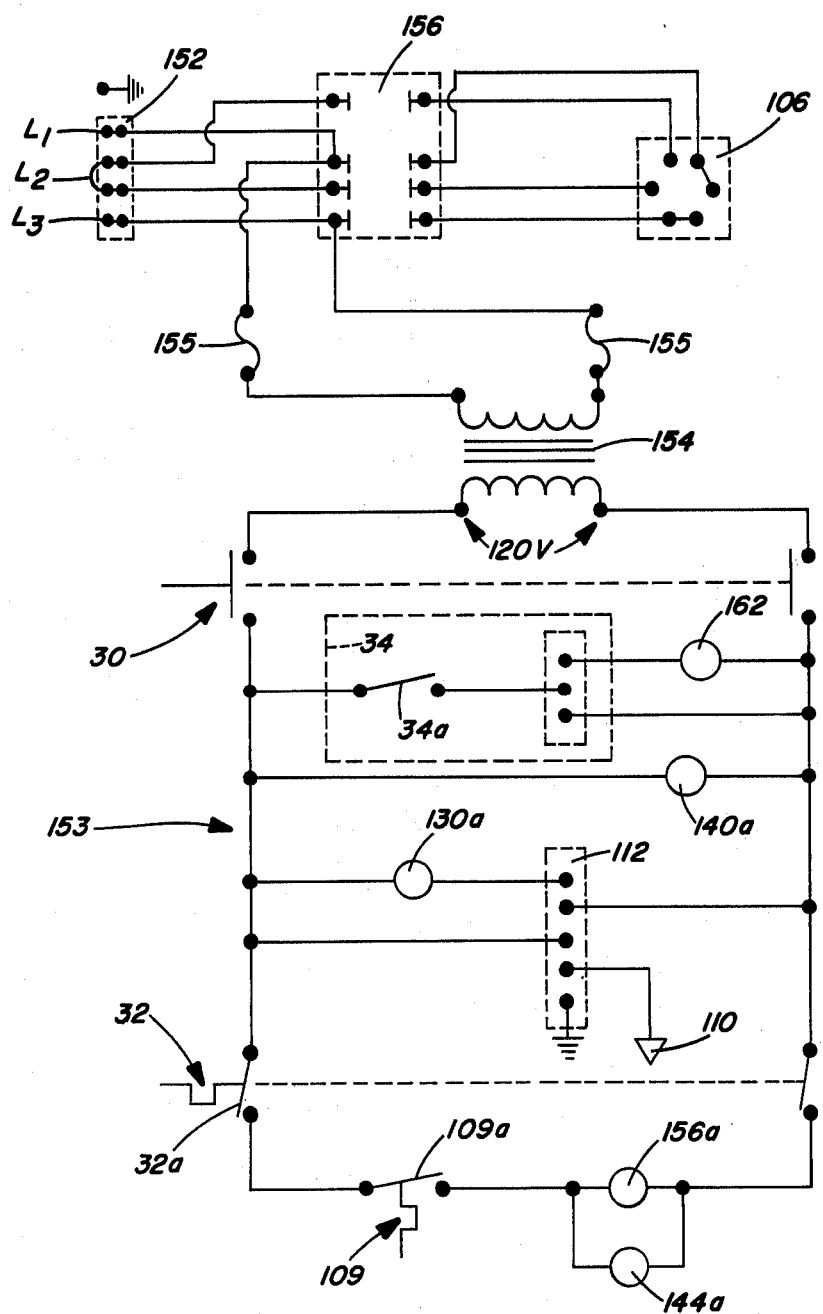
FIG. 12 is a schematic of the electrical circuit which controls the operation of the steam processor of the present invention.

A schematic of the electrical circuit for controlling the sequence of operation of the steam processor is illustrated in FIG. 12. The circuit shown is preferably wired for a 208/240 volt 3-phase outlet. Power inlet connections $L_1$, $L_2$, $L_3$, are made to a power bus 152. A 120 volt power supply for control circuitry indicated generally as 153, is provided by a stepdown transformer 154 having its primary winding connected to the power input circuits $L_1$, $L_2$. Fuses 155 are provided in the primary circuit to guard against overload. Referring also to FIG. 2, a power relay 156 controls the application of current to the boiler heater 106 (shown schematically in FIG. 12). The power relay 156 includes an actuating coil 156a forming a part of the control circuitry 153.

The flow of current from the stepdown transformer 154 to the control circuitry 153 is controlled by the "water on" power switch 30. The circuitry 153 includes a timer circuit for controlling the actuation of an audible signal source 162, a water level control circuit which controls the energizing of a solenoid 130a of the solenoid valve 130, and a steam generating control circuit which controls the actuation of the power relay coil 156a.

As shown in FIG. 12, the heater control circuit includes the steam control 32 and the thermostat 109 each having respective switches 32a, 109a, serially disposed between the power relay coil 156a and the "water on" power switch. A water supply solenoid coil 144a of the condensing water supply solenoid valve 144 is disposed in a parallel relationship with the power relay coil 156a so that both are energized concurrently. In this way, water is supplied to the drain manifold 146 to effect condensing of the exhausted steam whenever steam is being produced by the steam generator 22.

The solenoid coils 144a, 156a are energized when both the steam control switch 32a and the thermostat switch 109a are closed. As explained above, the thermostat switch 109 is normally closed unless the heater 106 exceeds a predetermined temperature. The frequency and/or duration of closure of the switch 32a is determined by the position of the steam control 32, set by the operator at the commencement of the cycle.

The actuation of the water supply solenoid coil 130a is controlled by the solid state module 112 operating in conjunction with the water level sense probe 110. Thus, whenever the "water on" power switch 30 is depressed and the water level is below a predetermined level on the sense probe 110, the coil 130a will be energized to allow water to flow into the steam generator 22 until a proper water level in the steam generator 22 is reached.

A solenoid coil 140a of the drain valve 140 is disposed across the legs of the 120 volt power supply. Consequently, the normally opened drain control valve 140 is energized and closed whenever the "water on" power switch is depressed, allowing the steam generator 22 to fill. With this circuit configuration, the steam generator will automatically drain whenever the power switch 30 is released or power to the steam processor in interrupted. This feature precludes the possibility of inadvertently leaving the steam generator filled when not in use.

As shown in FIG. 12, the timer 34 controls the actuation of the audible signal source, preferably a buzzer, 162. Upon closure of the switch 34a at the termination of a preset cooking time, the timer 34 is operative to actuate the buzzer 162 for a short interval of time, preferably 3 seconds, to indicate that the cycle is complete. In the preferred embodiment, the timer merely controls the actuation of the buzzer 162. It is recognized that the timer 34 could be used to terminate the production of steam in the steam generator by appropriate circuit modifications.

The overall operation of the steam processor is as follows: Depression of the "water on" power switch 30 will commence the flow of water to the steam generator 22 through the solenoid control valve 130. The steam chamber 22a fills at the rate of ⅛ gallons per minute, as determined by the flow regulator 126. Typically, an empty chamber will fill in approximately five minutes. Once a predetermined level in the generator 22 has been reached, the probe 110 sensing this level will deactivate the valve 130. The steam control 32 is then adjusted for the desired cooking rate and the timer 34 is adjusted for a desired cooking time interval. The closure of the internal switch 32a will concurrently energize the power relay 156 and the water supply solenoid valve 144. As the water in the steam chamber 22 begins to boil, steam will flow from the chamber 22 through the outlet 90, to the diffusion chamber 118 and then enter the cooking chamber 20.

As steam is produced in the steam generator 22, the depleted water will be replenished at the rate ⅛ gallons per minute whenever the probe 110 senses water below a predetermined level. In this way, the quantity of water in the steam vessel 22a will remain relatively constant and the rate at which steam is produced will be dependant solely on the duration and frequency at which the heater 106 is energized by the steam control 32.

The solenoid control valve 144 is energized concurrently with the heater power relay 156 and thus, condenser water is supplied whenever steam is being produced by the generator. As was explained above, the condensing of steam at the chamber outlet 62 produces a sub-atmospheric pressure in the drain and serves to purge the chamber 20 of air to increase the heat transfer efficiency of the steam. Additionally, this pressure reduction encourages the flow of steam out of the steam generator 22. To conserve water, it is allowed to flow to the drain manifold 146 only when the heater 106 is energized. At the conclusion of the cooking cycle, the buzzer 162 will be energized by the timer 34.

Although the invention has been described with a certain degree of particularity, various modifications and changes can be made to it by those skilled in the art without departing from the spirit or scope of the invention as described and hereinafter claimed.

What is claimed is:

1. A steam processor for use in the preparation of food or the like, comprising:
   (a) an enclosed, insulated cooking chamber for heating food items placed in said chamber by contact with steam, having a steam inlet and an outlet for discharging excess steam and condensate;
   (b) means for providing access to the interior of said cooking chamber;
   (c) a source of steam including:
      (i) a steam generator including a fluid reservoir;
      (ii) conduit means communicating with the steam generator for supplying and draining fluid to and from the reservoir;
      (iii) control means including level sensing means and valve means for controlling the fluid communication between the reservoir and a source of fluid, said valve means further comprising means responsive to deactivation of said steam processor, for draining the contents of said steam generator;
      (iv) heating means for vaporizing the fluid in said steam generator;
      (v) a steam supply conduit for conveying steam produced in the steam generator to the steam inlet in the cooking chamber;
   (d) a steam control means for regulating the rate at which steam is produced in the steam generator comprising an operator variable cycling device for intermittently energizing the heating means.

2. The apparatus of claim 1 wherein said steam control means controls the frequency and duration at which the heating means is energized.

3. The apparatus of claim 1 wherein said steam control means is operative to vary the flow of steam into the cooking chamber from a predetermined minimum to 100% of a predetermined maximum flow rate.

4. The apparatus of claim 1 further including steam condensing means located near the outlet of said cooking chamber and operative to condense steam discharged into said outlet thereby producing a condition of lower pressure at said outlet.

5. The apparatus of claim 1 wherein said conduit means includes a single conduit communicating with the reservoir of said steam generator that serves as both a supply and drain conduit.

6. A steam processor for use in the preparation of food or the like, comprising:
   (a) an enclosed, insulated cooking chamber for heating food items placed in said chamber by contact with steam, having a steam inlet and an outlet for discharging excess steam and condensate;
   (b) means for providing access to the interior of said cooking chamber;
   (c) a source of steam including:
      (i) a steam generator including a water reservoir;
      (ii) conduit means communicating with the steam generator for supplying and draining water to and from the reservoir;
      (iii) water control means including water level sensing means and valve means responsive to water level sensing signals from said level sensing means for controlling the fluid communication between the reservoir and a source of water;
      (iv) heating means for vaporizing the water in said steam generator;
      (v) a steam supply conduit for conveying steam produced in the steam generator to the steam inlet in the cooking chamber;
   (d) a steam control means for regulating the rate at which steam is produced in the steam generating chamber comprising a device for varying the heat output of the heating means; and
   (e) steam condensing means located near the outlet of said cooking chamber and operative to condense steam discharge into said outlet thereby producing a condition of lower pressure at said outlet.

7. The apparatus of claim 7 wherein said valve means further comprises a means responsive to deactivation of said steam processor, for draining the contents of said steam generator.

8. The apparatus of claim 6 wherein said steam control means comprises an operator variable cycling device that controls the on-time and the off-time of the heating means.

* * * * *